US012024867B2

(12) United States Patent
Dan et al.

(10) Patent No.: US 12,024,867 B2
(45) Date of Patent: Jul. 2, 2024

(54) KITCHEN FAUCET WITH GARBAGE DISPOSER

(71) Applicant: Xiamen Solex High-Tech Industries Co., Ltd., Fujian (CN)

(72) Inventors: Tangjun Dan, Fujian (CN); Lihong Hu, Fujian (CN); Wenxing Chen, Fujian (CN)

(73) Assignee: Xiamen Solex High-Tech Industries Co., Ltd., Fujian (CN)

(*) Notice: Subject to any disclaimer, the term of this patent is extended or adjusted under 35 U.S.C. 154(b) by 260 days.

(21) Appl. No.: 17/824,058

(22) Filed: May 25, 2022

(65) Prior Publication Data

US 2022/0381016 A1 Dec. 1, 2022

(30) Foreign Application Priority Data

May 26, 2021 (CN) ........................ 202121150251.X

(51) Int. Cl.

| | |
|---|---|
| ***B02C 25/00*** | (2006.01) |
| ***B02C 23/36*** | (2006.01) |
| ***E03C 1/05*** | (2006.01) |
| ***E03C 1/266*** | (2006.01) |
| *B02C 18/00* | (2006.01) |

(52) U.S. Cl.

CPC ............ *E03C 1/2665* (2013.01); *B02C 23/36* (2013.01); *B02C 25/00* (2013.01); *E03C 1/057* (2013.01); *B02C 18/0084* (2013.01); *B02C 18/0092* (2013.01); *B02C 2201/063* (2013.01)

(58) Field of Classification Search

CPC ... E03C 1/057; E03C 1/2665; B02C 18/0092; B02C 18/0084; B02C 25/00; B02C 23/36

See application file for complete search history.

(56) References Cited

FOREIGN PATENT DOCUMENTS

| | | | | |
|---|---|---|---|---|
| CN | 111218964 A | * | 6/2020 | ............... E03C 1/04 |
| CN | 211421268 U | * | 9/2020 | ............. E03C 1/122 |
| CN | 212053017 U | * | 12/2020 | ............... E03C 1/04 |
| CN | 212053023 U | * | 12/2020 | ............... E03C 1/04 |
| JP | H10225648 A | * | 8/1998 | ............... E03C 1/04 |
| JP | H10225649 A | * | 8/1998 | ............. B02C 18/42 |

* cited by examiner

*Primary Examiner* — Faye Francis

(74) *Attorney, Agent, or Firm* — Cooper Legal Group LLC

(57) ABSTRACT

A kitchen faucet with a garbage disposer includes a faucet unit, the garbage disposer, and a sensing unit. The faucet unit includes a water outlet passage unit, and the water outlet passage unit is disposed with a first control valve configured to control an opening and a closing of the water outlet passage unit. The garbage disposer is located under a water outlet of the water outlet passage unit of the faucet unit. The sensing unit is disposed on the faucet unit and is configured to generate a normal water outlet instruction and a garbage disposal instruction respectively according to a long sensing distance and a short sensing distance. The first control valve is configured to be opened and closed through the normal water outlet instruction, and the first control valve and the garbage disposer are respectively configured to be opened and closed through the garbage disposal instruction.

15 Claims, 7 Drawing Sheets

KITCHEN FAUCET WITH GARBAGE DISPOSER

RELATED APPLICATIONS

This application claims priority to Chinese patent application number 202121150251.X, filed on May 26, 2021. Chinese patent application number 202121150251.X is incorporated herein by reference.

FIELD OF THE DISCLOSURE

The present disclosure relates to a kitchen faucet, and in particular to a kitchen faucet with a garbage disposer.

BACKGROUND OF THE DISCLOSURE

In a traditional kitchen garbage disposal, kitchen garbage is collected and uniformly processed by garbage stations. In order to improve environmental performance, a kitchen faucet with a garbage disposer has appeared in society. The garbage disposer is directly installed at a bottom of a sink. The kitchen garbage is grinded and processed by a grinding mechanism in the garbage disposer, and then washed into the sewer after grinding. The kitchen faucet with the garbage disposer in the prior art comprises a housing, a dual control trigger element, a water supply control valve, a water valve control module, and a water valve communication module. The housing comprises a faucet notch corresponding to the faucet and a water outlet. The dual control trigger element is disposed on a housing wall of the housing. The water supply control valve is disposed in the housing, and the water supply control valve is connected between the faucet notch and the water outlet. The water valve control module is disposed in the housing, and the water valve control module is each electrically in communication with the dual control trigger element and the water supply control valve. The water valve communication module is disposed in the housing, and the water valve communication module is electrically in communication with the water valve control module, so that a conduction state of the water supply control valve and a grinding start of the grinding mechanism are triggered in response to a trigger signal generated by the dual control trigger element in an associated manner. The water valve control module and the grinding mechanism are directly activated after the touch sensor is activated. The disadvantages are that: a normal water outlet mode of the faucet is restricted, and there may be dry grinding without adding water.

BRIEF SUMMARY OF THE DISCLOSURE

The present disclosure provides a kitchen faucet with a garbage disposer to solve the deficiencies in the background.

In order to solve the technical problem, a first technical solution of the present disclosure is as follows.

A kitchen faucet with a garbage disposer comprises a faucet unit, the garbage disposer, and a sensing unit. The faucet unit comprises a water outlet passage unit, and the water outlet passage unit is disposed with a first control valve configured to control an opening and a closing of the water outlet passage unit. The garbage disposer is located under a water outlet of the water outlet passage unit. The sensing unit is disposed on the faucet unit and is configured to generate a normal water outlet instruction and a garbage disposal instruction respectively according to a long sensing distance and a short sensing distance shorter than the long sensing distance. The sensing unit is in communication with each of the first control valve and the garbage disposer. The first control valve is configured to be opened and closed through the normal water outlet instruction, and the first control valve and the garbage disposer are respectively configured to be opened and closed through the garbage disposal instruction.

In a preferred embodiment, the kitchen faucet with the garbage disposer further comprises a delayer. The delayer is in communication with the sensing unit and the garbage disposer, and the delayer is configured to control the garbage disposer to be opened after the first control valve is controlled to be opened for a predetermined delay time through the garbage disposal instruction.

In a preferred embodiment, the kitchen faucet with the garbage disposer further comprises a control box. The first control valve is disposed in the control box. The faucet unit comprises a faucet body, and the faucet body is disposed with a control valve and a handle configured to drive the control valve. The sensing unit is disposed on the faucet body. The water outlet passage unit comprises a water supply passage connected to the control valve, an intermediate water passage connected between the control valve and the first control valve, and a water outlet passage partially disposed in the faucet body and connected to the control valve.

In a preferred embodiment, the intermediate water passage is disposed with a water flow sensor. The control box is disposed with a controller, and the controller is in communication with each of the first control valve, the sensing unit, the garbage disposer, and the water flow sensor.

In a preferred embodiment, the garbage disposer comprises a processing box, a grinding mechanism, and a power mechanism, and the grinding mechanism and the power mechanism are disposed in the processing box. The power mechanism is operatively coupled to the grinding mechanism to drive the grinding mechanism to rotate to achieve grinding, and the sensing unit is in communication with the power mechanism.

A second technical solution of the present disclosure is as follows.

A kitchen faucet with a garbage disposer comprises a faucet unit, the garbage disposer, and a sensing unit. The faucet unit comprises a water outlet passage unit, and the water outlet passage unit comprises a first water passage and a second water passage. The first water passage is disposed with a first control valve configured to control an opening and a closing of the first water passage, and the second water passage is disposed with a second control valve configured to control an opening and a closing of the second water passage. The garbage disposer is located under a water outlet of the faucet unit. The sensing unit is disposed on the faucet unit and is configured to generate a normal water outlet instruction and a garbage disposal instruction respectively according to a long sensing distance and a short sensing distance shorter than the long sensing distance. The sensing unit is in communication with each of the first control valve, the second control valve, and the garbage disposer. The first control valve is configured to be controlled to be opened and closed through the normal water outlet instruction, and the second control valve is configured to be controlled to be opened and closed through the garbage disposal instruction.

In a preferred embodiment, the kitchen faucet with the garbage disposer further comprises a delayer. The delayer is in communication with the sensing unit and the garbage disposer, and the delayer is configured to control the garbage disposer to be opened after the first control valve is controlled to be opened for a predetermined delay time through the garbage disposal instruction.

In a preferred embodiment, the kitchen faucet with the garbage disposer further comprises a control box. Each of the first control valve and the second control valve is disposed in the control box. The faucet unit comprises a faucet body, and the faucet body is disposed with a control valve and a handle configured to drive the control valve. The sensing unit is disposed on the faucet body. The water outlet passage unit further comprises a cold water supply passage, a hot water supply passage, and a water outlet passage partly disposed in the faucet body. The cold water supply passage comprises a first water dividing port and a second water dividing port. The second water dividing port is connected to the second control valve. The hot water supply passage is connected to the control valve. The first water passage comprises an intermediate water supply passage connected between the first water dividing port and the control valve and an intermediate water passage connected between the control valve and the first control valve. The first control valve is connected to the water outlet passage. The second water passage is connected to the second control valve. The second control valve is connected to the water outlet passage.

In a preferred embodiment, a water flow sensor is disposed on the intermediate water passage. A controller is disposed in the control box, and the controller is in communication with the first control valve, the second control valve, the sensing unit, the garbage disposer, and the water flow sensor.

In a preferred embodiment, the garbage disposer comprises a processing box, a grinding mechanism, and a power mechanism, and the grinding mechanism and the power mechanism are disposed in the processing box. The power mechanism is operatively coupled to the grinding mechanism to drive the grinding mechanism to rotate to achieve grinding, and the sensing unit is in communication with the power mechanism.

Compared with the existing techniques, the technical solution has the following advantages.

The sensing unit can respectively generate the normal water outlet instruction and the garbage disposal instruction according to the long sensing distance and short sensing distance. The normal water outlet instruction controls the opening and the closing of the first control valve to control switching of the normal water outlet mode. The garbage disposal instruction controls the opening and the closing of the first control valve (or the second control valve in embodiment 1) and the garbage disposer. A single sensor can control both normal water outlet and garbage disposal. Moreover, the water outlet and the garbage disposer are activated in linkage to avoid dry grinding of garbage disposers, the cost is reduced, and the operation is convenient.

DETAILED DESCRIPTION OF THE EMBODIMENTS

Figure 1:
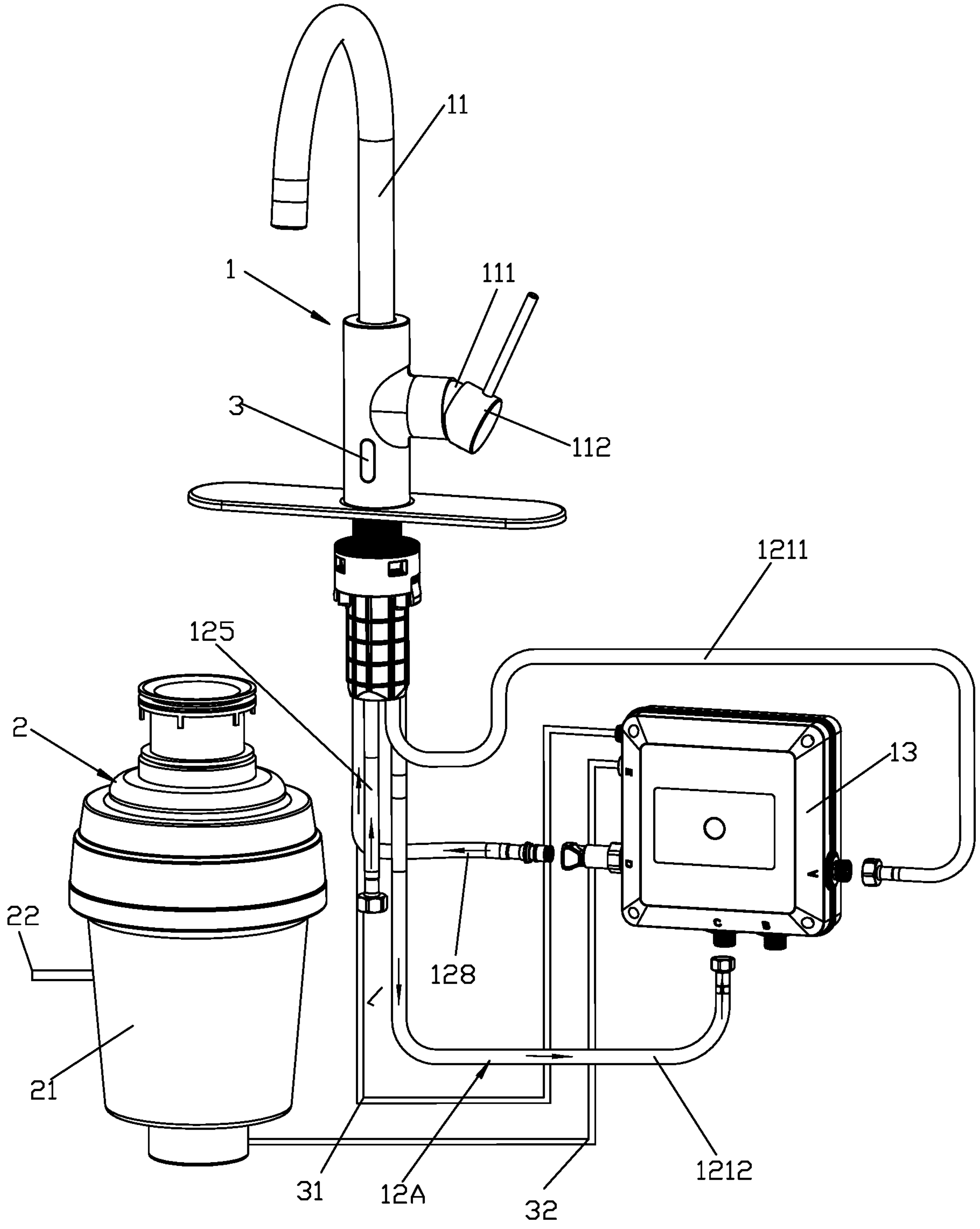
FIG. 1 illustrates a first perspective view of a kitchen faucet in Embodiment 1, when the kitchen faucet is in a normal water outlet mode.
Figure 2:
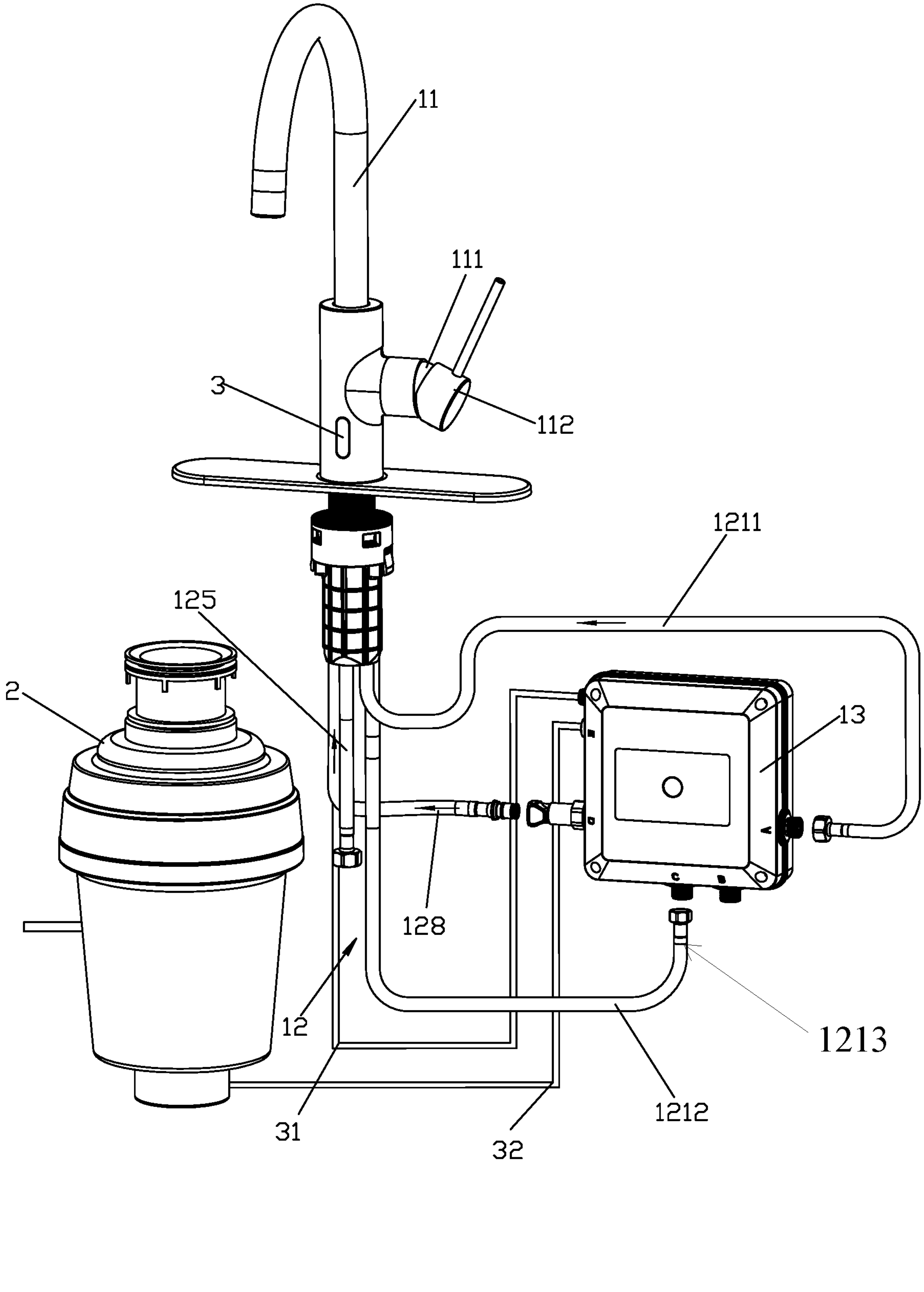
FIG. 2 illustrates a second perspective view of the kitchen faucet in Embodiment 1, when the kitchen faucet is in a garbage disposal mode.
Figure 3:
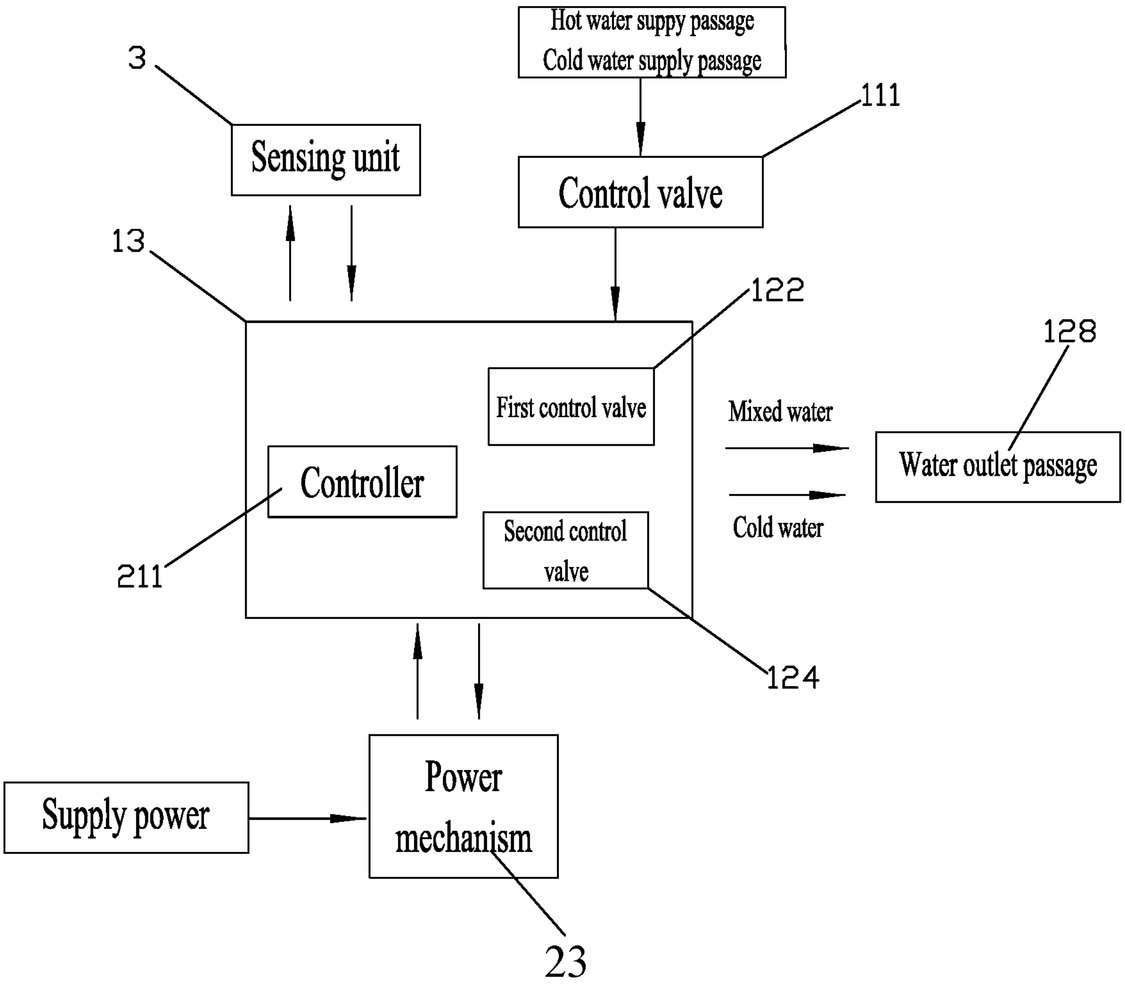
FIG. 3 illustrates a schematic diagram of a working principle of the kitchen faucet in Embodiment 1.
Figure 4:
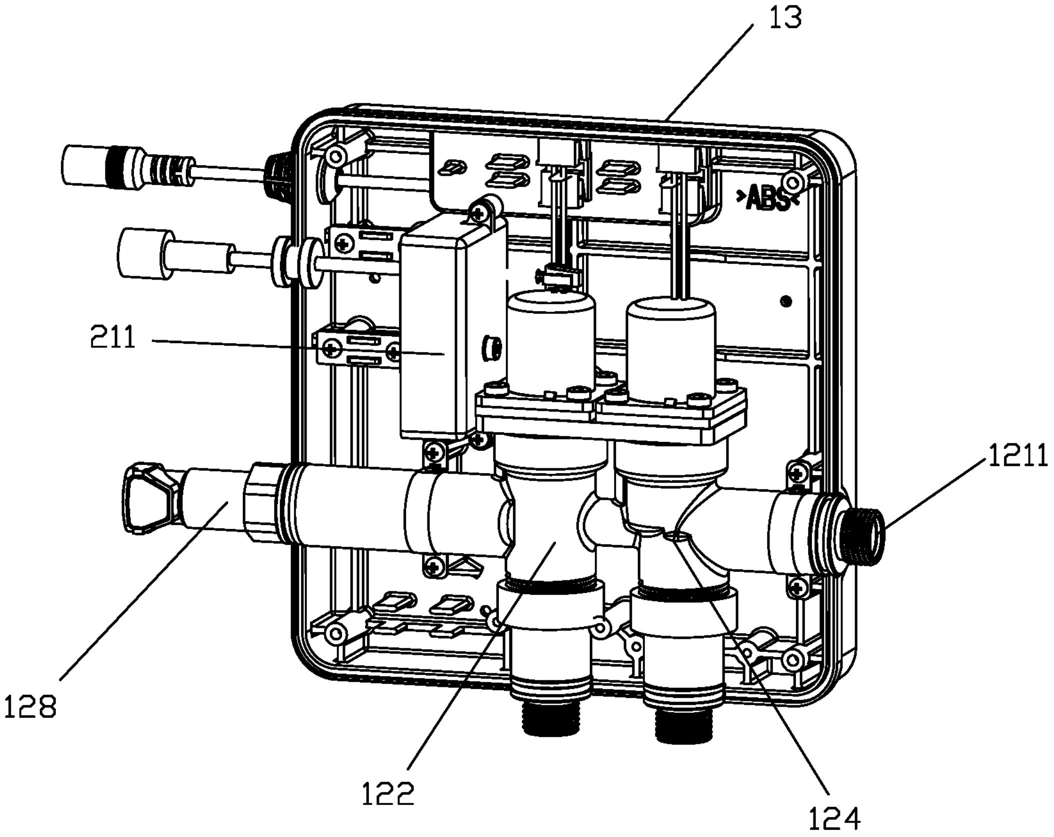
FIG. 4 illustrates a perspective view of a control box with a front housing removed in Embodiment 1.
Figure 5:
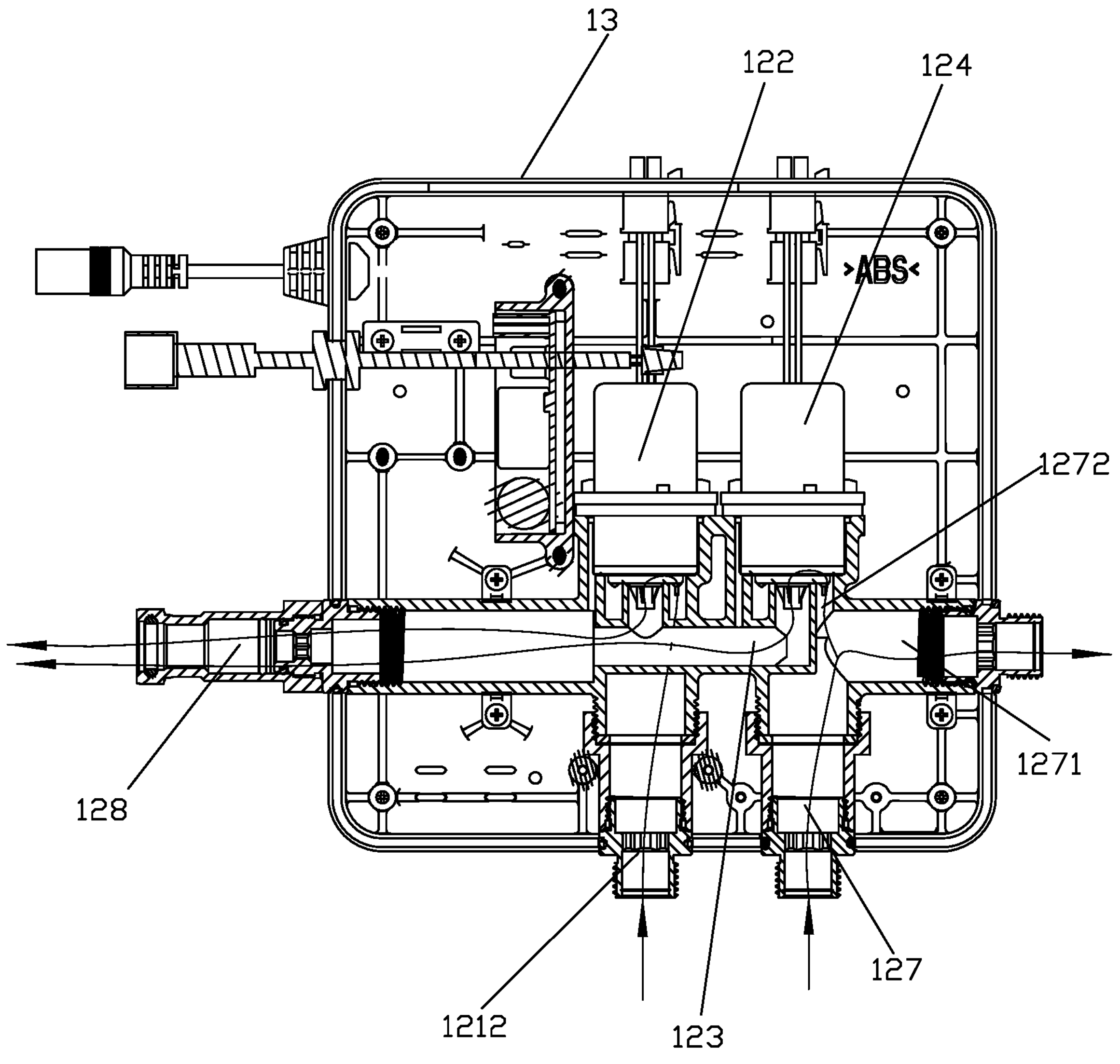
FIG. 5 illustrates a front view of the control box with the front housing removed in Embodiment 1, illustrating waterways of the control box.

The present disclosure will be further described below in combination with the accompanying drawings and embodiments.

The embodiments of the disclosure described herein are not intended to be exhaustive or to limit the disclosure to precise forms disclosed. Rather, the embodiments selected for description have been chosen to enable one skilled in the art to practice the disclosure. Although the disclosure is described in connection with water, it should be understood that additional types of fluids may be used.

Embodiment 1

Referring to FIGS. 1 to 5, a kitchen faucet with a garbage disposer 2 comprises a faucet unit 1, a garbage disposer 2, and a sensing unit 3.

The faucet unit 1 comprises a faucet body 11 and a water outlet passage unit 12. The faucet body 11 is disposed with a control valve 111 and a handle 112 configured to drive the control valve 111 to control an opening and a closing of the control valve 111 and a flow rate and a temperature of water that is flowing from the control valve 111. The water outlet passage unit 12 comprises a first water passage 12A and a second water passage 123. The first water passage 12A is disposed with a first control valve 122 configured to control an opening and a closing of the first water passage 12A, and the second water passage 123 is disposed with a second control valve 124 configured to control an opening and a closing of the second water passage 123. The water outlet passage unit 12 further comprises a cold water supply passage 127, a hot water supply passage 125, and a water outlet passage 128 partly disposed in the faucet body 11. The cold water supply passage 127 comprises a first water dividing port 1271 and a second water dividing port 1272, and the second water dividing port 1272 is connected to the second control valve 124. The hot water supply passage 125 is connected to the control valve 111. The first water passage 12A comprises an intermediate water supply passage 1211 connected between the first water dividing port 1271 and the control valve 111 and an intermediate water passage 1212 connected between the control valve 111 and the first control valve 122. The first control valve 122 is connected to the water outlet passage 128. The second water passage 123 is connected to the second control valve 124, and the second control valve 124 is connected to the water outlet passage 128. Mixed water that is flowing from the control valve 111 is used for a normal water outlet mode, and cold water that is flowing from the second water dividing port 1272 is used for a garbage disposal mode, which is convenient to use and enhances an effect of garbage treatment. The faucet unit 1 further comprises a control box 13. Each of the first control valve 122 and the second control valve 124 is disposed in the control box 13, and the first control valve 122 and the second control valve 124 are solenoid valves.

The garbage disposer 2 comprises a processing box 21, a grinding mechanism and a power mechanism 23 disposed in the processing box 21. The power mechanism 23 is operatively coupled to the grinding mechanism to drive the grinding mechanism to rotate to achieve grinding. The grinding mechanism is not shown in the drawings. The processing box 21 is located exactly under a water outlet of the water outlet passage 128 of the faucet unit 1. According to needs, a power cord 22 is additionally provided to be connected between the power mechanism 23 and supply power.

The sensing unit 3 is disposed on the faucet body 11 and is configured to generate a normal water outlet instruction and a garbage disposal instruction respectively according to a long sensing distance and a short sensing distance shorter than the long sensing distance. The sensing unit 3 is in communication with each of the first control valve 122, the second control valve 124, and the power mechanism 23 of the garbage disposer 2. The first control valve 122 is controlled to be opened and closed through the normal water outlet instruction, and the second control valve 124 and the power mechanism 23 of the garbage disposer 2 are respectively controlled to be opened and closed through the garbage disposal instruction. The sensing unit 3 is an infrared sensor, an ultrasonic sensor, etc. According to needs, a first signal line 31 is additionally provided to be connected between the sensing unit 3 and a controller 211, and a second signal line 32 is provided to be connected between the controller 211 and the power mechanism 23.

If necessary, the kitchen faucet also comprises a delayer, which is in communication with the sensing unit 3 and the power mechanism 23 of the garbage disposer 2. The delayer is configured to control the power mechanism 23 of the garbage disposer 2 to be opened after the second control valve 124 is controlled to be opened for a predetermined delay time through the garbage disposal instruction, which ensures that the water flows into the garbage disposer 2 for a period of time (i.e., the predetermined delay time) before the garbage disposer 2 is activated, therefore avoiding dry grinding.

According to needs, the controller 211 is disposed in the control box 13, and the controller 211 is in communication with each of the first control valve 122, the second control valve 124, the sensing unit 3, and the garbage disposer 2. The ability for the sensing unit 3 to be in communication with each of the first control valve 122, the second control valve 124, and the power mechanism 23 is achieved through that the sensing unit 3 being in communication with the controller 211 and the controller 211 being in communication with each of the first control valve 122, the second control valve 124, and the power mechanism 23. A water flow sensor 1213 is disposed on the intermediate water passage 1212, and the controller 211 is in communication with the first control valve 122, the second control valve 124, the sensing unit 3, the garbage disposer 2, and the water flow sensor 1213.

Use conditions of the kitchen faucet are follows. 1. The normal water outlet mode: (1) when the long sensing distance (such as greater than 30 mm) is sensed by the sensing unit 3 and the control valve 111 is opened due to the handle 112 being opened, the first control valve 122 is controlled to be opened, and the first water passage 12A discharges the mixed water. (2) When the long sensing distance is sensed by the sensing unit 3 again, the first water passage 12A is closed. The kitchen faucet is in a normal water outlet state. If necessary, the faucet body 11 is disposed with a red light light emitting diode (LED). When the long sensing distance is sensed by the sensing unit 3, the red light LED flashes when the normal water outlet mode is started, and there is no light on while the first water passage 12A is discharging water. 2. The garbage disposal mode: (1) when the short sensing distance (such as less than 30 mm) is sensed by the sensing unit 3, the second control valve 124 is controlled to be opened. When the first control valve 122 is in an opened state, the garbage disposal instruction is configured to control the first control valve 122 to be closed and the second water passage 123 discharges the cold water. (2) After the second water passage 123 discharges the cold water for the predetermined delay time (such as 5 seconds), the garbage disposer 2 is started. (3) The garbage disposer 2 can be shut down as required. (a) Automatic shutdown: The garbage disposer 2 judges whether to stop grinding according to a grinding load status. The garbage disposer 2 will automatically stop grinding so as to simultaneously cause the second control valve 124 to be closed after a predetermined time (such as 5 seconds). (b) Manually shutdown: when the short sensing distance is sensed by the sensing unit 3 again, the garbage disposer 2 is shut down immediately, and the second control valve 124 is closed after the predetermined time (such as 5 seconds) so that the second water passage 123 will be closed. (c) Automatically shut down after a predetermined time: a working time of the garbage disposer 2 can be preset. When the working time reaches the predetermined time (for example, 5 minutes), the garbage disposer 2 will be automatically shut down (to avoid mistakenly inserting non-grindable garbage, which will cause the garbage disposer 2 to be in a continuous working status). According to needs, the faucet body 11 is disposed with a green light LED. When the short sensing distance is sensed, the green light LED flashes, and the green light flashes slowly during operation.

Embodiment 2

Figure 6:
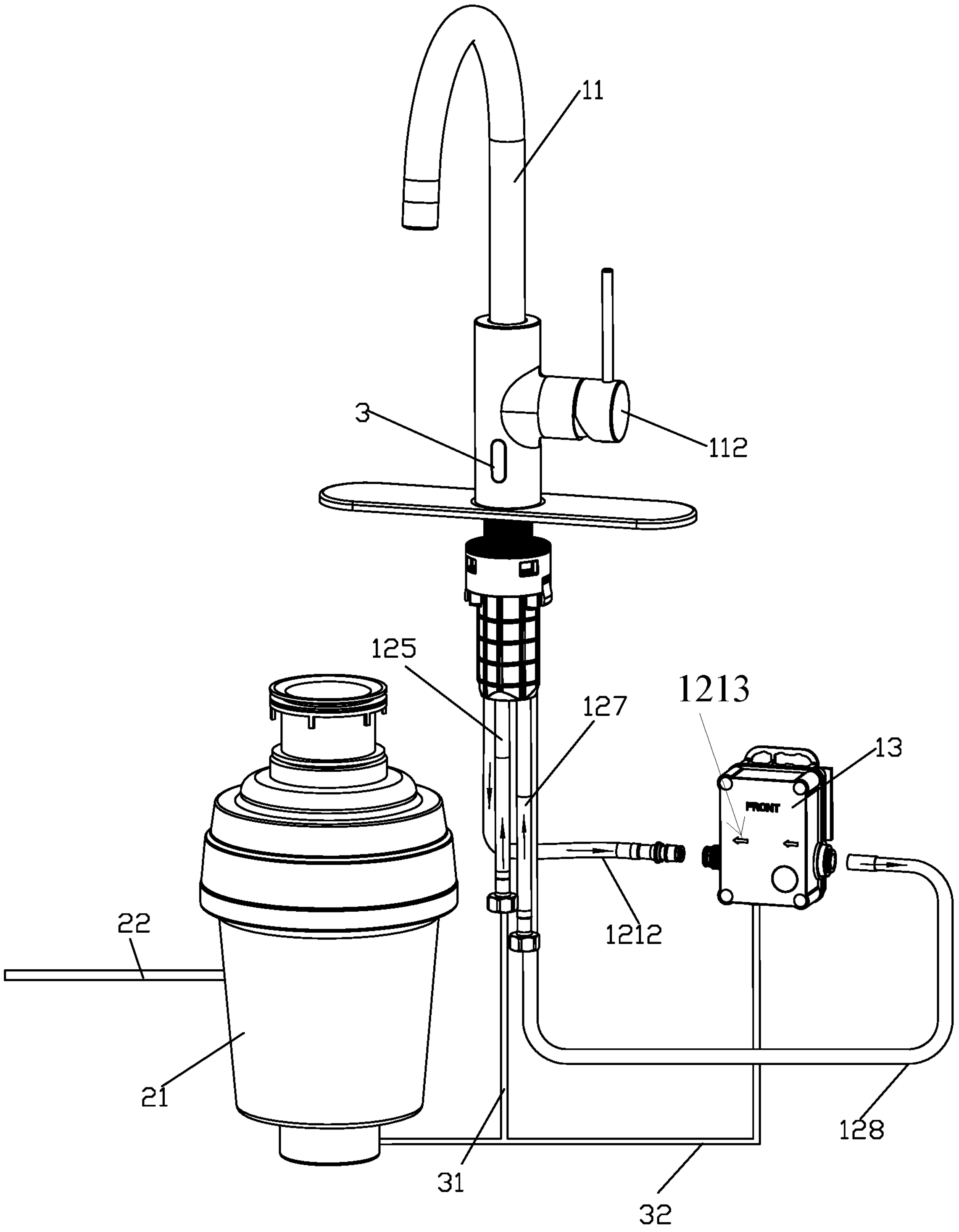
FIG. 6 illustrates a perspective view of a kitchen faucet in Embodiment 2.
Figure 7:
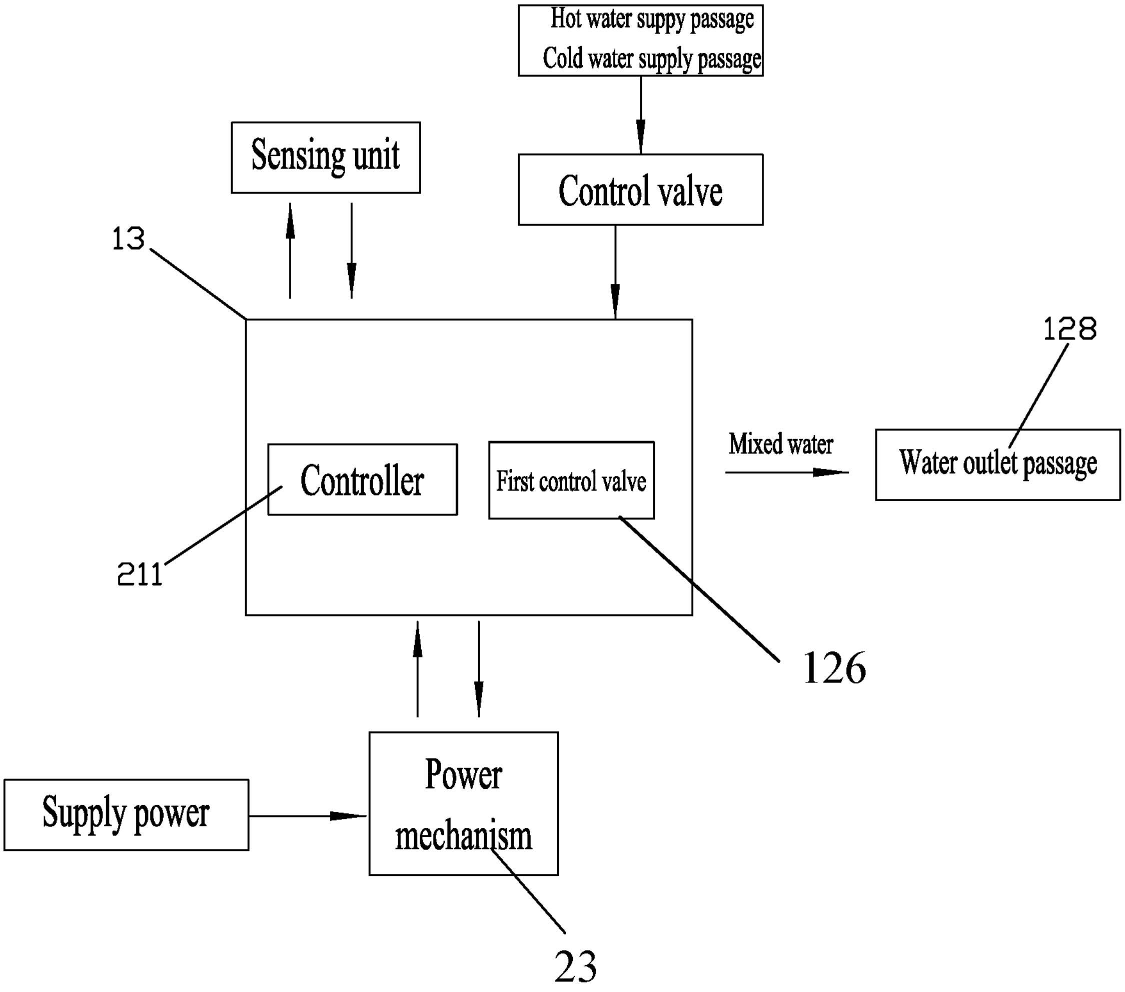
FIG. 7 illustrates a schematic diagram of a working principle of the kitchen faucet in Embodiment 2.

Referring to FIG. 6 and FIG. 7. The difference from Embodiment 1 is that: the water outlet passage unit 12 of the faucet unit 1 is only disposed with a first control valve 126 configured to control an opening and a closing of the water outlet passage unit 12. The water outlet passage unit 12 comprises a water supply passage (the cold water supply passage 127 and the hot water supply passage 125) connected to the control valve 111, an intermediate water passage 1212 connected between the control valve 111 and the first control valve 126, and a water outlet passage 128 partially disposed in the faucet body 11 and connected to the control valve 111. The sensing unit 3 is disposed in the faucet unit 1 and is configured to generate a normal water outlet instruction and a garbage disposal instruction respectively according to the long sensing distance and the short sensing distance. The sensing unit 3 is in communication with the control valve 111 and the garbage disposer 2, and the first control valve 126 is controlled to be opened and closed through the normal water outlet instruction. The first control valve 126 and the garbage disposer 2 are controlled to be opened and closed through the garbage disposal instruction. The intermediate water passage 1212 is disposed with a water flow sensor 1213, and the controller 211 is in communication with each of the first control valve 126, the sensing unit 3, the garbage disposer 2, and the water flow sensor 1213.

Use conditions of the kitchen faucet are follows. 1. The normal water outlet mode: (1) When the long sensing distance (such as greater than 30 mm) is sensed by the sensing unit 3 and the control valve 111 is opened due to the handle 112 being opened, the first water passage 12A discharges the mixed water. (2) When the long sensing distance is sensed by the sensing unit 3 again, the first water passage 12A is closed. The kitchen faucet is in a normal water outlet state. If necessary, the faucet body 11 is disposed with a red light LED. When the long sensing distance is sensed by the sensing unit 3, the red light LED flashes when the normal water outlet mode is started, and there is no light on while the first water passage 12A is discharging water. 2. The garbage disposal mode: (1) When the short sensing distance (such as less than 30 mm) is sensed by the sensing unit 3 and the control valve 111 is opened due to the handle 112 being opened, the second water passage 123 discharges the cold water. (2) After the second water passage 123 discharges the cold water for the predetermined delay time (such as 5 seconds), the garbage disposer 2 is started. (3) The garbage disposer 2 can be shut down as required. (a) Automatic shutdown: the garbage disposer 2 judges whether to stop grinding according to a grinding load status. The garbage disposer 2 will automatically stop grinding so as to simultaneously cause the first control valve 126 to be closed after a predetermined time (such as 5 seconds). (b) Manually shutdown: when the short sensing distance is sensed by the sensing unit 3 again, the garbage disposer 2 is shut down immediately, and the second water passage 123 will be closed after the predetermined time (such as 5 seconds). (c) Automatically shut down after a predetermined time: a working time of the garbage disposer 2 can be preset. When the working time reaches the predetermined time (for example, 5 minutes), the garbage disposer 2 will be automatically shut down (to avoid mistakenly inserting non-grindable garbage, which will cause the garbage disposer 2 to be in a continuous working status). According to needs, the faucet body 11 is disposed with a green light LED. When the short sensing distance is sensed, the green light LED flashes, and the green light flashes slowly during operation. When the handle 112 is closed, no water will flow regardless of whether the kitchen faucet is in the normal water outlet mode or the garbage disposal mode.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A kitchen faucet with a garbage disposer, comprising:
a faucet unit,
the garbage disposer, and
a sensing unit, wherein:
the faucet unit comprises a water outlet passage unit,
the water outlet passage unit is disposed with a first control valve configured to control an opening and a closing of the water outlet passage unit,
the garbage disposer is located under a water outlet of the water outlet passage unit,
the sensing unit is disposed on the faucet unit and is configured to generate a normal water outlet instruction and a garbage disposal instruction respectively according to a long sensing distance and a short sensing distance shorter than the long sensing distance,
the sensing unit is in communication with each of the first control valve and the garbage disposer,
the first control valve is configured to be opened and closed through the normal water outlet instruction, and
the first control valve and the garbage disposer are respectively configured to be opened and closed through the garbage disposal instruction.

2. The kitchen faucet with the garbage disposer according to claim 1, further comprising:
a delayer, wherein:
the delayer is in communication with the sensing unit and the garbage disposer, and
the delayer is configured to control the garbage disposer to be opened after the first control valve is controlled to be opened for a predetermined delay time through the garbage disposal instruction.

3. The kitchen faucet with the garbage disposer according to claim 1, further comprising:
a control box, wherein:
the first control valve is disposed in the control box,
the faucet unit comprises a faucet body,
the faucet body is disposed with a control valve and a handle configured to drive the control valve,
the sensing unit is disposed on the faucet body, and
the water outlet passage unit comprises a water supply passage connected to the control valve, an intermediate water passage connected between the control valve and the first control valve, and a water outlet passage partially disposed in the faucet body and connected to the control valve.

4. The kitchen faucet with the garbage disposer according to claim 3, wherein:
the intermediate water passage is disposed with a water flow sensor,
the control box is disposed with a controller, and
the controller is in communication with each of the first control valve, the sensing unit, the garbage disposer, and the water flow sensor.

5. The kitchen faucet with the garbage disposer according to claim 1, wherein:
the garbage disposer comprises a processing box, a grinding mechanism, and a power mechanism,
the grinding mechanism and the power mechanism are disposed in the processing box,
the power mechanism is operatively coupled to the grinding mechanism to drive the grinding mechanism to rotate to achieve grinding, and
the sensing unit is in communication with the power mechanism.

6. The kitchen faucet with the garbage disposer according to claim 2, further comprising:
a control box, wherein:
the first control valve is disposed in the control box,
the faucet unit comprises a faucet body,
the faucet body is disposed with a control valve and a handle configured to drive the control valve,
the sensing unit is disposed on the faucet body, and
the water outlet passage unit comprises a water supply passage connected to the control valve, an intermediate water passage connected between the control valve and the first control valve, and a water outlet passage partially disposed in the faucet body and connected to the control valve.

7. The kitchen faucet with the garbage disposer according to claim 2, wherein:
the garbage disposer comprises a processing box, a grinding mechanism, and a power mechanism,
the grinding mechanism and the power mechanism are disposed in the processing box, the power mechanism is operatively coupled to the grinding mechanism to drive the grinding mechanism to rotate to achieve grinding, and the sensing unit is in communication with the power mechanism.

8. A kitchen faucet with a garbage disposer, comprising:

a faucet unit, the garbage disposer, and a sensing unit, wherein:

the faucet unit comprises a water outlet passage unit, the water outlet passage unit comprises a first water passage and a second water passage, the first water passage is disposed with a first control valve configured to control an opening and a closing of the first water passage, the second water passage is disposed with a second control valve configured to control an opening and a closing of the second water passage, the garbage disposer is located under a water outlet of the faucet unit, the sensing unit is disposed on the faucet unit and is configured to generate a normal water outlet instruction and a garbage disposal instruction respectively according to a long sensing distance and a short sensing distance shorter than the long sensing distance, the sensing unit is in communication with each of the first control valve, the second control valve, and the garbage disposer, the first control valve is configured to be controlled to be opened and closed through the normal water outlet instruction, and the second control valve is configured to be controlled to be opened and closed through the garbage disposal instruction.

9. The kitchen faucet with the garbage disposer according to claim 8, further comprising:

a delayer, wherein:

the delayer is in communication with the sensing unit and the garbage disposer, and the delayer is configured to control the garbage disposer to be opened after the first control valve is controlled to be opened for a predetermined delay time through the garbage disposal instruction.

10. The kitchen faucet with the garbage disposer according to claim 8, further comprising:

a control box, wherein:

each of the first control valve and the second control valve is disposed in the control box, the faucet unit comprises a faucet body, the faucet body is disposed with a control valve and a handle configured to drive the control valve, the sensing unit is disposed on the faucet body, the water outlet passage unit further comprises a cold water supply passage, a hot water supply passage, and a water outlet passage partly disposed in the faucet body, the cold water supply passage comprises a first water dividing port and a second water dividing port, the second water dividing port is connected to the second control valve, the hot water supply passage is connected to the control valve, the first water passage comprises an intermediate water supply passage connected between the first water dividing port and the control valve and an intermediate water passage connected between the control valve and the first control valve, the first control valve is connected to the water outlet passage, the second water passage is connected to the second control valve, and the second control valve is connected to the water outlet passage.

11. The kitchen faucet with the garbage disposer according to claim 10, wherein:

a water flow sensor is disposed on the intermediate water passage, a controller is disposed in the control box, and the controller is in communication with the first control valve, the second control valve, the sensing unit, the garbage disposer, and the water flow sensor.

12. The kitchen faucet with the garbage disposer according to claim 8, wherein:

the garbage disposer comprises a processing box, a grinding mechanism, and a power mechanism, the grinding mechanism and the power mechanism are disposed in the processing box, the power mechanism is operatively coupled to the grinding mechanism to drive the grinding mechanism to rotate to achieve grinding, and the sensing unit is in communication with the power mechanism.

13. The kitchen faucet with the garbage disposer according to claim 9, further comprising:

a control box, wherein:

each of the first control valve and the second control valve is disposed in the control box, the faucet unit comprises a faucet body, the faucet body is disposed with a control valve and a handle configured to drive the control valve, the sensing unit is disposed on the faucet body, the water outlet passage unit further comprises a cold water supply passage, a hot water supply passage, and a water outlet passage partly disposed in the faucet body, the cold water supply passage comprises a first water dividing port and a second water dividing port, the second water dividing port is connected to the second control valve, the hot water supply passage is connected to the control valve, the first water passage comprises an intermediate water supply passage connected between the first water dividing port and the control valve and an intermediate water passage connected between the control valve and the first control valve, the first control valve is connected to the water outlet passage, the second water passage is connected to the second control valve, and the second control valve is connected to the water outlet passage.

14. The kitchen faucet with the garbage disposer according to claim 13, wherein:

a water flow sensor is disposed on the intermediate water passage, a controller is disposed in the control box, and the controller is in communication with the first control valve, the second control valve, the sensing unit, the garbage disposer, and the water flow sensor.

15. The kitchen faucet with the garbage disposer according to claim 9, wherein:

the garbage disposer comprises a processing box, a grinding mechanism, and a power mechanism, the grinding mechanism and the power mechanism are disposed in the processing box, the power mechanism is operatively coupled to the grinding mechanism to drive the grinding mechanism to rotate to achieve grinding, and the sensing unit is in communication with the power mechanism.

* * * * *